No. 680,939. Patented Aug. 20, 1901.
S. D. POOLE.
FLEXIBLE HARROW.
(Application filed May 6, 1901.)
(No Model.) 2 Sheets—Sheet 1.

WITNESSES
INVENTOR
Staley D. Poole
By _____ His Attorney

No. 680,939. Patented Aug. 20, 1901.
S. D. POOLE.
FLEXIBLE HARROW.
(Application filed May 6, 1901.)
(No Model.)
2 Sheets—Sheet 2.
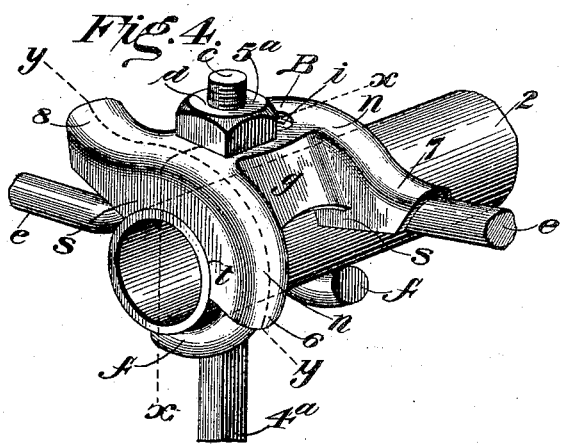
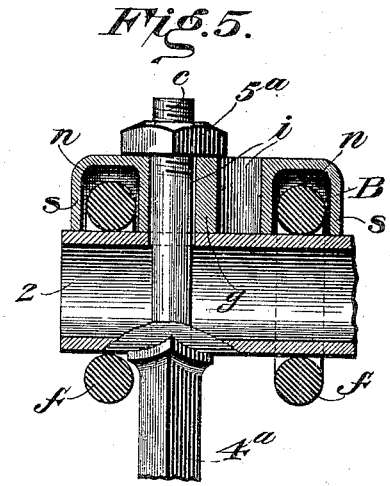
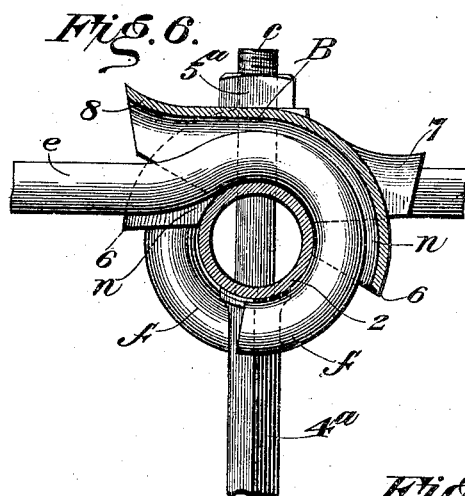
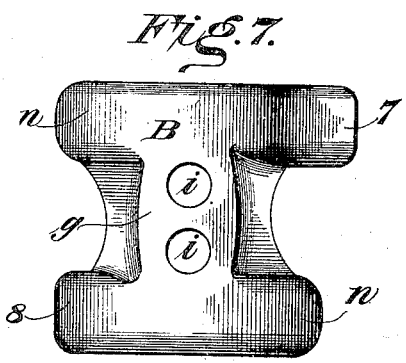
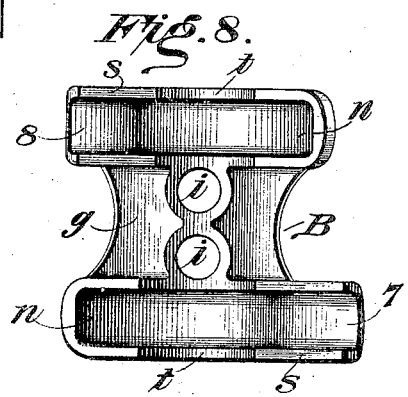
WITNESSES
INVENTOR
Staley D. Poole
By
His Attorney

UNITED STATES PATENT OFFICE.

STALEY D. POOLE, OF MOLINE, ILLINOIS, ASSIGNOR TO DEERE & COMPANY, OF SAME PLACE.

FLEXIBLE HARROW.

SPECIFICATION forming part of Letters Patent No. 680,939, dated August 20, 1901.

Application filed May 6, 1901. Serial No. 58,983. (No model.)

*To all whom it may concern:*

Be it known that I, STALEY D. POOLE, a citizen of the United States, residing at Moline, in the county of Rock Island and State of Illinois, have invented certain new and useful Improvements in Flexible Harrows; and I do hereby declare the following to be a full, clear, and exact description of the invention, such as will enable others skilled in the art to which it appertains to make and use the same.

This invention relates to flexible harrows; and it consists, substantially, in the improvements hereinafter more particularly described, and pointed out in the claims.

The invention has for one object to provide means whereby the strength and security of the coupling or connections between the harrow-bars are greatly enhanced and also whereby the flexible character of the harrow is greatly improved.

A further object is to dispense with the use of bolts and pins as forming any part of the movable connection between the harrow-bars and to provide a construction by which the greater part of the strain is borne by the harrow-bars themselves.

A further object of the invention is to provide an exceedingly simple form of retainer and link for movably connecting the harrow-bars and one also which enables the harrow to be rapidly put together and again taken apart whenever desired.

A still further object is to provide a flexible harrow which is readily capable of being collapsed or folded up in entirety, so as to occupy but small space in shipment or transportation, and also in such manner that the harrow-teeth are protected from injury either by contact with each other or by engagement with external objects.

The above and additional objects I attain by the means illustrated in the accompanying drawings, in which—

Figure 1:
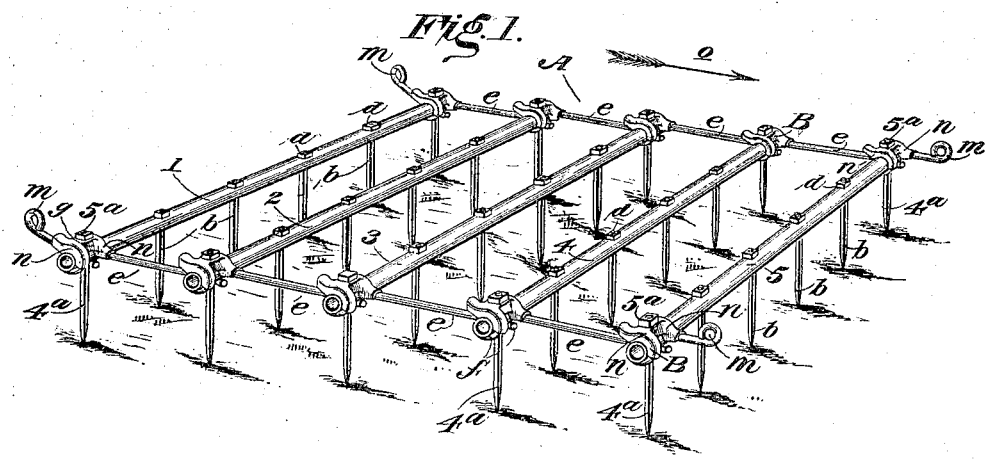
Figure 2:
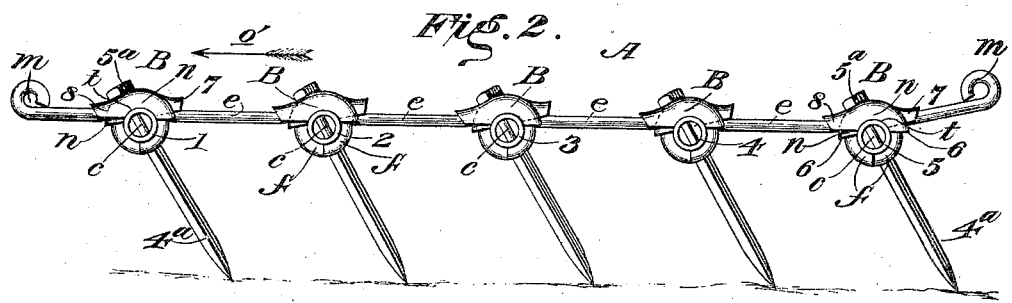
Figure 3:
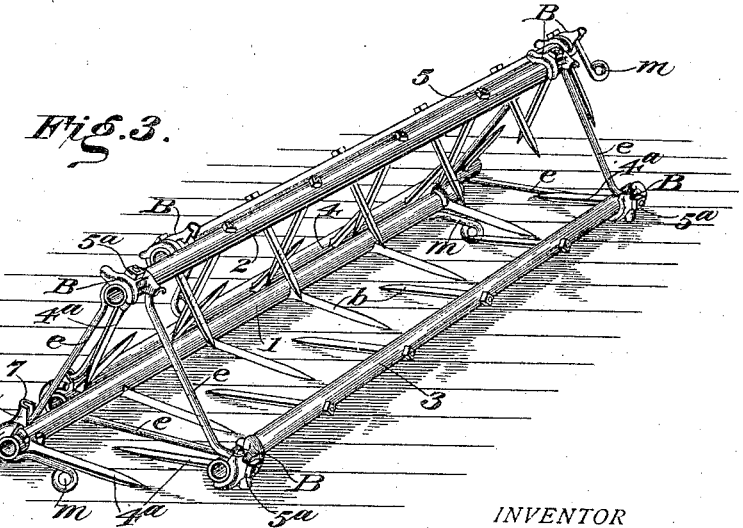

Figure 1 is a view in perspective of a flexible harrow embodying my improvements, the said view indicating the harrow-teeth as substantially perpendicular or in vertical position. Fig. 2 is a side elevation representing the slanting or inclined position assumed by the harrow-teeth when the harrow is drawn in one direction across the plowed land. Fig. 3 is a view in perspective, representing the harrow as collapsed or folded up for shipment or transportation. Fig. 4 is an enlarged perspective view in detail to show the construction of retainer and the link connection between the harrow-bars. Fig. 5 is a sectional detail view taken on the line $x\,x$ of Fig. 4, and Fig. 6 is a similar view taken on the line $y\,y$ of said Fig. 4. Fig. 7 is a top or plan view of the link-retainer detached, and Fig. 8 is a bottom plan view thereof.

Before proceeding with a more detailed description it may be stated that I preferably construct the harrow-bars in the form of pipes or tubes of suitable length and diameter, and which bars are provided at suitable intervals with openings of proper shape and size for the reception of the harrow-teeth, which latter may be of any desired form. I employ a peculiarly-constructed connection between the harrow-bars at the ends, and by which when the harrow is drawn over the plowed land in either direction the teeth of each harrow-bar have imparted thereto a sort of vibratory reciprocating motion, due to the flexible character of the connections between the bars, and which action of the teeth both pounds and scratches the earth-clods in an obvious manner. In this way the teeth are enabled to pass over obstructions which might otherwise clog them, and the general effectiveness of the harrow is much improved. The movable connections between the harrow-bars are such that the harrow is readily collapsible or foldable for shipment or transportation without requiring any refitting or adjusting of any of the parts when the harrow is again unfolded for use. The construction is very simple and strong and is also inexpensive to manufacture as compared with many forms of flexible harrows heretofore devised.

Specific reference being had to the accompanying drawings, A represents my improved flexible harrow as a whole or entirety, the same being composed of any suitable number of harrow-bars (designated at 1 2 3 4 5) and each provided with any preferred number of teeth $b$, passing through or fitted in transverse openings in the bar, suitably spaced apart. Said bars are preferably of wrought iron or steel and of tubular form, and the teeth $b$ are preferably formed each with a shank $c$, passing through its tubular bar transversely and secured in place by means of a nut $d$ or in any other suitable way. This arrangement impairs the strength of the bars as little as possible, besides being simple and permitting the ready removal and insertion of the teeth. In order to movably connect the bars, so as to give a flexible character or quality to the harrow, I provide at each end of each bar a removable or detachable retaining device or casting B, and between the retainers or castings of adjacent or successive bars I arrange suitable connecting-links $e$, each having at each end a hook $f$, passing about or around the bar in such manner as to permit a free and easy movement between all the bars. The said retaining devices B are each constructed of duplicate sockets $n$, the sides $s$ $s$ of each of which are formed at their lower edge with a semicircular recess $t$, by which to adapt the retainers to the harrow-bars, as shown in the drawings. The sockets of each retaining device are connected by means of an intermediate portion $g$, having preferably two holes or openings $i$ for the passage through one or the other of them of the shank of one of the teeth (marked $4^a$) by which to secure the retaining device in place upon the bar, a suitable fastening-nut $5^a$ being screwed down upon the upper projecting end of said tooth. It will thus be seen that the retaining devices are each adjustable on its harrow-bar. The ends 6 of the sockets of each retaining device B terminate downwardly, as it were, and at opposite sides of the harrow-bar, the said sockets so resting upon the said bars as to permit a free or yieldable movement between the bars and the hooked ends of the connecting-links between the latter. The ends 7 and 8 of each socket are disposed at opposite sides of its bar, as stated, and said end 7 of the one socket is somewhat extended horizontally in one direction, while the said end 8 of the other socket is also extended in the opposite direction and is inclined or upturned at a suitable angle beyond a horizontal, so as to permit of the desired action or movement of the harrow-teeth when the harrow is in use. It will be understood that the upper part of the sockets at each of the ends or extremities 7 and 8 thereof constitutes a limiting-stop, against which the links abut at the extreme limits of movement imparted to the latter or to the bars in operation.

From the described construction of the retaining device B it will be seen that when the harrow is drawn in one direction the teeth of each harrow-bar all assume a slanting or inclined position; but when the harrow is drawn in the opposite direction the teeth are prevented from turning beyond an approximately vertical position, it being evident that the slanting position assumed by the teeth is due entirely to the increased angle of each of the said upturned ends 8 of the said sockets. To more specifically define said sockets, it may be stated that they are similarly constructed, but reversely arranged to each other, their upper ends being slightly extended and one of said ends being horizontal and the other upturned beyond a horizontal. The said retaining devices B being seated and secured in place upon the harrow-bars, as explained, there is no binding between the hooked ends of the links and the sockets, and it will be seen that a perfect flexibility of the harrow throughout is had. The harrow is provided at each end with couplings or hooks $m$ $m$ for the attachment of suitable draft appliances for drawing the harrow over the ground, and, as shown in Fig. 1, the teeth are all in the position (vertical) assumed thereby when the harrow is drawn in the direction indicated by the arrow marked $o$. In Fig. 2 the teeth of the harrow are all in the slanting or inclined position assumed thereby when the harrow is pulled or drawn in the opposite direction indicated by the arrow marked $o'$. When in the position indicated in Fig. 1, the harrow may be said to be a "pulverizing-harrow," and when in the position indicated in Fig. 2 it may be said to be a "smoothing-harrow," in that in one case the action of the teeth is to crush or pulverize the earth-clods, while in the other case the action is to spread out the pulverized or crushed earth smoothly and evenly.

As shown in Fig. 3, the construction of the retaining devices and connecting-links between the harrow-bars permits the harrow to be folded upon itself in such manner that the teeth thereof are all made to point inwardly without encountering each other or engaging with or coming into contact with the person handling the harrow or with external objects generally. In this way the teeth are all protected from breakage or injury, and the harrow is reduced to a comparatively small and compact bulk without occupying much space either in shipment or in transportation. In thus folding the harrow it is to be noted that none of the parts are removed or changed, and thus the harrow is ready for use by simply unfolding or straightening out the same. In constructing the harrow or putting the parts of the same together the hooked ends $f$ of two connecting-links $e$ are placed around one of the harrow-bars reversely at near each end of the bar, and then a retaining device B is laid in place upon each bar at near each end thereof, so that the said hooked ends $f$ will be partially received in the sockets $n$ of the said devices, while still permitting the hooks to engage or embrace the bars and without in any manner interfering with the flexible action between the bars, as already explained. The depth or interior dimensions of the sockets of the retaining devices are such as to allow full play between the parts without any binding or unnecessary wabbling or looseness in action.

Of course it will be understood that I do not limit myself to the precise details of construction and arrangement herein shown and described. The retaining devices B keep the hooked ends of the connecting-links apart relatively, and said hooked ends of the links are also prevented from disconnecting from the bars by means of said devices.

Having thus fully described my invention, what I claim as new, and desire to secure by Letters Patent of the United States, is—

1. A flexible harrow comprising suitable bars having teeth, links connecting the bars and movably engaging the same, and retaining devices detachably seated upon said bars and partially receiving the ends of contiguous links, said devices being constructed to permit the teeth to assume different positions according to the direction of travel of the harrow, substantially as described.

2. A flexible harrow comprising suitable bars having teeth, links connecting the bars and hooked at the ends to movably engage the latter, and devices retaining the links in place upon the bars and constructed to permit the teeth to assume a slanting or a vertical position according to the direction of travel of the harrow, substantially as described.

3. A flexible harrow comprising suitable bars having teeth, links connecting the bars and each hooked at the ends to movably engage the latter, and retaining devices for the links fastened upon the bars and constructed with sockets partially receiving the hooks and permitting flexibility between the bars, substantially as described.

4. A flexible harrow comprising suitable bars having teeth, links connecting the bars and having hooks at the ends passing around the bars reversely, and a retaining device at each end of each of the bars and constructed of duplicate sockets partially receiving said hooks and terminating at opposite sides of the bars with a horizontally-extended portion and an upturned portion, substantially as described 5. The combination with the harrow-bars, of the retaining devices secured in place thereon at near each end, and the connecting-links having hooks engaging the bars and movably held in place by said retaining devices, substantially as described.

6. The combination with the harrow-bars having teeth, of the retaining devices held in place each by means of one of the teeth, and the connecting-links having hooks loosely engaging the bars, and held in place by said retaining devices, substantially as described.

7. The combination with the harrow-bars having teeth, of the retaining devices on said bars each constructed of two sockets, one of which terminates at one end on one side of its bar with a horizontal extension, and the other of which at the like end terminates with an upturned extension disposed on the other side of the bar, and connecting-links having hooks engaging the bars and passing through the sockets, substantially as described.

8. The combination with the harrow-bars, of the retaining devices each constructed with the sockets and the intermediate connecting portion provided with holes, the links between the bars and having hooks passing around the bars and through the sockets, and a harrow-tooth passing through one of the openings of each socket and secured in any suitable way, substantially as described.

9. A flexible harrow comprising suitable bars having teeth, links connecting the bars and movably engaging the same, and adjustable devices retaining the links in place upon the bars, and constructed with abutments arranged at different angles and permitting the harrow-teeth to assume different positions according to the direction of travel of the harrow, substantially as described.

In testimony whereof I affix my signature in presence of two witnesses.

STALEY D. POOLE.

Witnesses:
CHAS. H. POPE,
CHARLES T. MOREY.